United States Patent
Moya et al.

(10) Patent No.: US 10,042,048 B1
(45) Date of Patent: Aug. 7, 2018

(54) SUPERPIXELS FOR IMPROVED STRUCTURE AND TERRAIN CLASSIFICATION USING MULTIPLE SYNTHETIC APERTURE RADAR IMAGE PRODUCTS

(71) Applicant: National Technology & Engineering Solutions of Sandia, LLC, Albuquerque, NM (US)

(72) Inventors: Mary M. Moya, Albuquerque, NM (US); Mark W. Koch, Albuquerque, NM (US); David Nikolaus Perkins, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 822 days.

(21) Appl. No.: 14/626,582

(22) Filed: Feb. 19, 2015

Related U.S. Application Data

(60) Provisional application No. 61/942,532, filed on Feb. 20, 2014.

(51) Int. Cl.
*G01S 13/90* (2006.01)

(52) U.S. Cl.
CPC ............................... *G01S 13/9023* (2013.01)

(58) Field of Classification Search
CPC ... G01S 13/90; G01S 13/9023; G06K 9/0063; G06T 2207/10044; G06T 2207/30181; G06T 7/13
USPC ......................................................... 342/25
See application file for complete search history.

(56) References Cited

U.S. PATENT DOCUMENTS

| | | |
|---|---|---|
| 8,265,870 B1 | 9/2012 | Nguyen et al. |
| 9,239,384 B1 | 1/2016 | Chow et al. |
| 2008/0118118 A1* | 5/2008 | Berger ............... G06K 9/342 |
| | | 382/128 |
| 2012/0197439 A1 | 8/2012 | Wang et al. |

(Continued)

FOREIGN PATENT DOCUMENTS

WO   WO 2015132723 A1   9/2015

OTHER PUBLICATIONS

Achanta, et al. "SLIC Superpixels Compared to State-of-the-art Superpixel Methods", IEEE Transactions on Pattern Analysis and Machine Intelligence, vol. 34, No. 11, pp. 2274-2282, Nov. 2012.

(Continued)

*Primary Examiner* — Timothy A Brainard
(74) *Attorney, Agent, or Firm* — Medley, Behrens & Lewis, LLC

(57) ABSTRACT

Various embodiments presented herein relate to assigning labels to segments of a synthetic aperture radar (SAR) image, where the segments are based upon a speckle-reduced SAR image product. A plurality of SAR images of a scene are co-registered to form a registered stack of SAR images. A speckle-reduced SAR image product is generated based upon at least one registered SAR image in the registered stack of SAR images. The speckle-reduced SAR image product is segmented into a plurality of superpixels, and boundaries of the superpixels are applied to the at least one registered SAR image to form a segmented SAR image. A segment of the SAR image is then labeled as including or not including a feature, wherein the label is assigned based upon values of pixels in the segment.

20 Claims, 12 Drawing Sheets

(56) References Cited

U.S. PATENT DOCUMENTS

| | | |
|---|---|---|
| 2015/0170526 A1 | 6/2015 | Wang et al. |
| 2015/0279049 A1 | 10/2015 | Tojo et al. |
| 2015/0286340 A1 | 10/2015 | Send et al. |
| 2015/0332127 A1 | 11/2015 | Zheng et al. |
| 2016/0047903 A1 | 2/2016 | Dussan |
| 2016/0055237 A1 | 2/2016 | Tuzel et al. |

OTHER PUBLICATIONS

Fulkerson, et al. "Class Segmentation and Object Localization with Superpixel Neighborhoods", Computer Vision, 2009 IEEE 12th Int. Conference. pp. 670-677, Sep. 2009.

Ren, et al. "Learning a Classification Model for Segmentation", Proc. IEEE Int'l Conf. Computer Vision, vol. 1, pp. 10-17, Oct. 2003.

Su, et al., "A Supervised Classification Method Based on Conditional Random Fields with Multiscale Region Connection Calculus Model for SAR Image", IEEE Geoscience and Remote Sensing Letters, vol. 8, No. 3, pp. 497-501, May 2011.

Vedaldi, et al., "Quick Shift and Kernel Methods for Mode Seeking", Computer Vision, ECCV, pp. 705-718, Oct. 2008.

\* cited by examiner

SUPERPIXELS FOR IMPROVED STRUCTURE AND TERRAIN CLASSIFICATION USING MULTIPLE SYNTHETIC APERTURE RADAR IMAGE PRODUCTS

RELATED APPLICATION

This application claims priority to U.S. Provisional Patent Application No. 61/942,532, filed on Feb. 20, 2014, and entitled "SUPERPIXELS FOR IMPROVED STRUCTURE AND TERRAIN CLASSIFICATION USING MULTIPLE SYNTHETIC APERTURE RADAR PRODUCTS", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Synthetic aperture radar (SAR) images provide a wealth of information about structures and activities in an imaged scene. During the production of high-resolution, single-polarization SAR imagery, much more data and/or imagery is generated than available researchers and analysts can examine. Thus, automating the recognition of objects and features in SAR imagery is highly desired, e.g., to augment manual visual analysis. Superpixel segmentation (SPS) algorithms can be utilized to divide an image into small regions of close proximity pixels having similar intensities. Applying these SPS algorithms to optical images can reduce image complexity, enhance statistical characterization, and improve segmentation and categorization of scene objects and features. SPS algorithms typically require high signal-to-noise-ratio (SNR) images with low artifacts for accurate segmentation. SAR imagery, however, tends to include speckle, a product of coherent combining and cancelling of multi-path backscattered radar energy, which can complicate the extraction of superpixel segments and even preclude SPS usage.

SUMMARY

The following is a brief summary of subject matter that is described in greater detail herein. This summary is not intended to be limiting as to the scope of the claims.

Various embodiments presented herein relate to automating categorization of terrain and/or structure captured in radar imagery, such as, for example, synthetic aperture radar (SAR) imagery. A SAR image can include speckle, which is a deterministic artifact commonly found in SAR imagery. When a superpixel segmentation (SPS) algorithm is executed over the SAR image, the speckle in the SAR image impacts segmentation of the SAR image. That is, the speckle causes superpixels output by the SPS algorithm to be different from what the SPS algorithm would output if the SAR image were free of speckle. Accordingly, speckle can negatively impact operation of the SPS algorithm.

Therefore, the various embodiments presented herein relate to mitigating the deleterious effects of speckle during SPS. Prior to executing an SPS algorithm over the SAR image (e.g., in its original form), a speckle reduction process can be undertaken over the SAR image, resulting in a speckle-reduced SAR image product. Exemplary speckle-reduction processes include, but are not limited to, a sub-aperture multilook (SA-ML) process, a mean coherent change detection (MCCD) process, and a median radar cross section (MRCS) process. Other processes can also be executed, such as an interferometric height (IF-H) mapping process. One or more of these processes, in addition to reducing speckle, also reduces spatial resolution. Therefore, the speckle-reduced SAR image product can have a resolution that is lower than the resolution of the SAR image.

The SPS algorithm can then be executed over the speckle-reduced image product, resulting in segmentation of the speckle-reduced image product into a plurality of segments. Each segment comprises at least one pixel (and typically includes several pixels), where pixels in a segment have been found by the SPS algorithm to be related to one another. It can be ascertained that since the speckle-reduced image product has less speckle when compared to the original SAR image, the segmentation performed by the SPS algorithm will be less influenced by speckle. The segmented, reduced-speckle image product can be referred to as a superpixel image product.

In an embodiment, the superpixel image product can be formed from a speckle-reduced product that is registered with the original SAR image; accordingly, the superpixel image product is likewise registered with the original SAR image. Registration of the superpixel image product with the original SAR image causes the segments of the superpixel image product to be applicable to the original SAR image. Effectively, then, the original SAR image, and all other images registered with the superpixel image product, can be segmented into segments that respectively correspond to the segments of the superpixel image product. The segmented original SAR image is referred to as the segmented image.

Segments in the segmented image can subsequently be assigned labels based upon values of pixels in respective segments. With more particularity, a classifier can assign a label to a segment in the segmented image based upon values of pixels in the segment (without regard to values of pixels in other segments). For example, the classifier can be trained based upon labeled training data, such as manually identified segments that correspond to an object or feature of interest. Thus, for instance, the classifier can be trained based upon segments (of SAR images) manually identified as including a particular type of surface (e.g., a concrete building). The classifier, when provided with a segment from the segmented image, can output a value that is indicative of whether or not the segment includes a concrete building, and the classifier can label the segment as including (or not including) the concrete building based upon the value. The value output by the classifier, as noted above, is based upon values of pixels in the segment.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
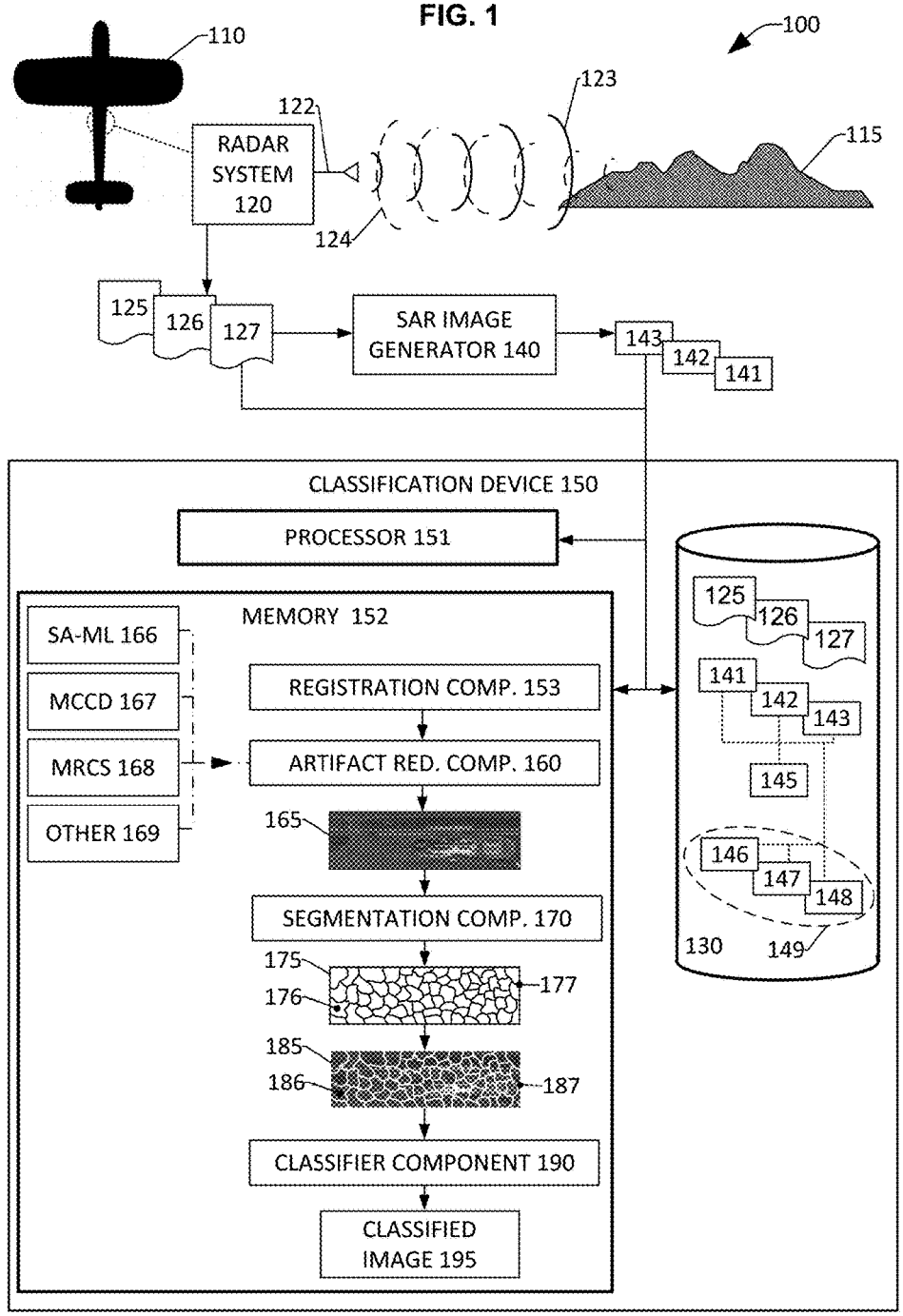
FIG. 1 illustrates an exemplary system for assigning labels to segments in a SAR image, where the segments are based upon a speckle-reduced SAR image product.

Various technologies pertaining to identifying an object or feature in a SAR image, wherein the SAR image may include speckle, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

SAR imaging systems deliver complex phase history data, which pass through Fourier transform processing to produce complex-valued backscatter images. Because multi-path backscattered energy can add and cancel coherently, resulting SAR images can include speckle, which can complicate application of standard image processing methods, such as superpixel segmentation (SPS), to SAR images.

FIG. 1 illustrates an exemplary system 100 that is configured to assign labels to one or more segments of a SAR image, where the segments are determined based upon a speckle-reduced SAR image product. FIG. 1 depicts an aircraft 110 navigating a scene 115, e.g., the aircraft 110 is flying in accordance with a known flight path(s) having a defined geometry relative to the scene 115.

The aircraft 110 has located thereon a radar system 120, which includes an antenna 122. The antenna 122 transmits radar signals 123, and the antenna 122 (or another antenna) receives radar echoes 124, which have been generated by reflection of the radar signals 123 from the scene 115. Transmission of the signals 123 can be performed in conjunction with a controller (not shown) incorporated into the radar system 120, wherein the controller can be a digital signal processor or other suitable circuit or processor.

For each pass of the aircraft 110 over the scene 115, data can be generated by the radar system 120, e.g., during a first pass of the aircraft 110 over the scene 115, the radar system 120 generates a first set of data 125, during a second pass of the aircraft 110 over the scene 115, the radar system 120 generates a second set of data 126, during an $n^{th}$ pass of the aircraft 110 over the scene 115, the radar system 120 generates a $n^{th}$ set of data 127, etc., where n is a positive integer. In an embodiment, the sets of data 125, 126, and 127 can be or include phase history data. Further, the sets of data 125, 126, and 127 can be in any suitable format, such as Ground-Based SAR Application Testbed File Format (GFF).

The system 100 comprises a classification device 150, which can be any suitable computing device, including but not limited to a desktop computing device, a laptop computing device, a mobile telephone, a wearable computing device, a server computing device, etc. The classification device 150 is in direct or indirect communication with the radar system 120, such that data generated by the radar system 120 (or data based upon data generated by the radar system 120) can be received at the classification device 150. For instance, the classification device 150 can be co-located with the radar system 120 on the aircraft. In another example, the classification device 150 can be located separately from the radar system 120. The classification device 150 comprises a data store 130, and the respective sets of data 125-127 can optionally be stored in the data store 130 for subsequent retrieval.

The system 100 also includes a SAR image generator 140 that is configured to generate (complex) SAR images 141, 142, and 143, based upon at least one of the data 125-127 (e.g., where the data 125-127 includes complex phase history data). The image generator 140 can exploit different phenomena of the complex backscatter data to produce the SAR images 141, 142 and 143. While shown as being separate from the classification device 150 and the radar system 120, it is to be understood that the SAR image generator 140 may be included in either of the classification system 150 or the radar system 120. The respective SAR images 141-143 can be stored in the data store 130 for subsequent retrieval.

The classification device 150 includes a processor 151 and a memory 152. The memory 152 includes components that are executable by the processor, wherein functionalities of the process, when executing the components, are described below.

The memory 152 includes a registration component 153 that can be configured to register the SAR images 141-143. In an embodiment, a SAR baseline image 145 can be selected from any of the SAR images 141-143 collected from the same scene 115. The registration component 153 can be then be configured to register each of the remaining SAR images 141-143 with the baseline SAR image 145, thereby forming a mapping between the baseline SAR image 145 and any of the SAR images 141-143, and thereby producing registered SAR images 146, 147, and 148, referred to collectively as a registered image stack 149. It is to be appreciated that while the registration component 153 is shown as being separate from the radar system 120, the registration component 153 may be included in either of the classification device 150 or the radar system 120. As shown, the registered image stack 149 can be stored in the data store 130 for subsequent retrieval.

In a situation where any of the SAR images 141-143 has a different resolution to any of the other SAR images, the registration component 153 can optionally be configured to resample any of the SAR images to enable the SAR images to have a common resolution. For example, when the SAR image 141 comprises x pixels and the SAR image 142 comprises y pixels, the registration component 153 can resample the SAR image 141 such that the SAR image 141 comprises y pixels.

The memory 152 can also include an artifact reduction component 160, wherein the artifact reduction component 160 is configured to generate an artifact-reduced image product 165 based upon at least one of the registered SAR images 146-148 in the registered image stack 149. In a scenario where noise contamination may be an issue for processing of SAR images 141-143, the artifact reduction component 160 can also be configured to reduce noise in at least one of the registered SAR images 146-148. For purposes of explanation, functionality of the components in the memory 152 will be described with reference to the registered SAR image 146, although it is to be understood that the functionality can be performed over other registered SAR images (e.g., registered SAR images 147, 148) in the registered image stack 149. The artifact reduction component 160 can be configured to generate the artifact-reduced SAR image product 165 based upon the registered SAR image 146, such that an amount of artifact(s) in the artifact-reduced SAR image product 165 is less than the amount of artifact(s) in the registered SAR image 146. The artifact-reduced SAR image product 165 can be perceived as an image comprising a plurality of pixels, wherein each pixel has a value or vector of values assigned thereto.

In a non-limiting example, the artifact reduction component 160 can be configured to perform at least one speckle-reduction operation over the registered SAR image 146, such that the artifact-reduced SAR image product 165 is a speckle-reduced image product. Accordingly, an amount of speckle in the artifact-reduced SAR image product 165 can be less than an amount of speckle in the (original) registered SAR image 146. Exemplary operations that can be performed by the artifact reduction component 160 include, but are not limited to, sub-aperture multilook imaging (SA-ML) 166, mean-over-time of coherent change detection (MCCD) imaging 167, and median-over-time of radar cross section (MRCS) imaging 168. The artifact reduction component 160 can also be configured to perform other operations 169 over the registered SAR image 146, such as an operation that generates interferometric height (IF-H) map data, which can be indicative of local height variations in the scene 115, and can augment available backscatter and coherent change information. In an embodiment, the SA-ML imaging 166 can reduce spatial resolution to reduce speckle while MCCD imaging 167 and MRCS imaging 168 can average values over time rather than over space, hence spatial resolution is preserved while speckle is reduced. In another embodiment, MCCD imaging 167 and MRCS imaging 168 can have the same spatial resolution as an originally received image 141-143, while SA-ML imaging 166 can have reduced spatial resolution from the originally received image 141-143. The exemplary speckle reduction operations are described in greater detail below.

It is to be appreciated that the artifact reduction component 160 can generate the artifact-reduced SAR image product 165 using a single artifact reduction operation (e.g., any of operations 166-169) or a combination of artifact reduction operations (e.g., a combination of operations 166-169). For example, the artifact-reduced SAR image product 165 can be a plurality of image products that are registered to one another. For instance, conceptually, the artifact-reduced SAR image product 165 can have a plurality of pixels, with each pixel in the artifact-reduced SAR image product 165 having a vector of values, and each value in the vector corresponding to a respective artifact reduction operation. Thus, a pixel in the artifact-reduced SAR image product 165 can have the vector of values [A, B, C] assigned thereto, where A is based upon an output of a first artifact-reduction operation relative to the registered SAR image 146, B is based upon an output of a second artifact-reduction operation relative to the registered SAR image 146, and C is based upon an output of a third artifact reduction operation relative to the registered SAR image 146. Additionally, each pixel in the artifact-reduced product 165 can have spatial values (e.g., range and azimuth coordinates) assigned thereto, which represent location of the pixel in the artifact-reduced SAR image product 165. It is to be appreciated that, since the artifact-reduced SAR image product 165 was created from one or more registered images 146-148, the artifact-reduced image product 165 is also registered to the baseline image 145 as well as all other registered images 146-148 in the stack 149.

The memory 152 can further comprise a segmentation component 170 that is configured to segment the artifact-reduced SAR image product 165 into a plurality of segments based upon respective values of respective pixels of the artifact-reduced SAR image product 165. For example, the segmentation component 170 can be configured to perform a pixel clustering operation on the artifact-reduced SAR image product 165, such that a plurality of pixel groupings (superpixels) are formed (and hence the artifact-reduced SAR image product 165 is segmented into the plurality of superpixels). The segmentation component 170 therefore divides (segments) the artifact-reduced SAR image product 165 into a plurality of segments, thus producing superpixel image product 175. The superpixel image product 175, as noted above, comprises a plurality of segments 176, each comprising a respective boundary 177, where each segment includes pixels of the artifact-reduced SAR image product 165 found to be correlated by the pixel clustering operation (e.g., proximate pixels having a similar value) performed by the segmentation component 170. Exemplary pixel clustering algorithms that can be utilized by the segmentation component 170 when segmenting the artifact-reduced product 165 into a plurality of segments include, but are not limited to, a QUICK-SHIFT algorithm and a simple linear iterative clustering (SLIC) algorithm. It is to be appreciated that, since the superpixel image product 175 was created from the artifact reduced SAR image product 165, that it too is registered to all other registered images 146-148.

As the superpixel image product 175 is registered with the SAR images in the stack 149, the segmentation component 170 can apply the boundaries 177 of the segments 176 of the superpixel image product 175 to all registered SAR images 146, 147, and 148 in the stack 149. In an example, the segmentation component 170 can apply the segments to the registered SAR image 146 (and thus to the original SAR image 143), thereby creating a segmented SAR image 185. The segmented SAR image 185 has a plurality of segments 186, bounded by boundaries 187, that respectively correspond to the segments 176 (and boundaries 177) in the superpixel image product 175. Each segment in the segments 186 comprises a respective plurality of pixels, which have values corresponding thereto. As noted above, however, as the superpixel image product 175 is registered with SAR images in the stack 149, the segments of the superpixel image product 175 can be applied to others of the registered SAR images in the stack 149. Thus, the registered SAR images in the stack 149 can each be segmented in accordance with the boundaries of the superpixels.

The memory 152 additionally comprises a classifier component 190, which can receive the segmented SAR image 185 and assign at least one label to at least one segment in the segmented SAR image 185 based upon values of pixels in the at least one segment (e.g., one label is assigned to each pixel in the segment(s) 186). Further, since each SAR image in the registered stack 149 is segmented, the classifier component 190 can assign the at least one label to the at least one segment based upon a vector of pixel values, wherein a number of entries in the vector maps to a number of images in the stack 149. Pursuant to an example, the classifier component 190 can be configured to determine if a segment represents a particular type of vegetation based upon pixel values in the segment. When the classifier component 190 determines that the segment represents the particular type of vegetation, the classifier component can assign a label to the segment in the segmented SAR image 185 that indicates that the segment represents the particular type of vegetation. It can be ascertained that the classifier component 190 can be configured to perform a classification based upon pixel values of a segment with respect to any suitable object, feature, or the like. For example, the classifier component 190 can be configured to determine whether a segment represents a body of water, a particular type of road surface, a ditch, etc.

The classifier component 190 can be trained to perform a classification based upon labeled training data. For example, analyst(s) can manually identify segments of SAR images that represent an object, feature, or the like that is to be classified. Likewise, negative training data can be considered, where analyst(s) manually identify segments of SAR images that do not represent the object, feature, or the like that is to be classified. Features of a segment that can impact whether the segment represents an object include, but are not limited to, size of the segment, shape of the segment, average intensity values of pixels in the segment, distribution of intensity values of pixels in the segment, etc. These features can be (inherently) identified when training the classifier component 190, and the classifier component 190 can perform suitable computations with respect to pixel values in the segment when classifying the segment as representing an object or feature or not representing the object or feature.

It is to be understood that artifacts in the SAR image 143 would impact segmentation of the registered SAR image 143 if the segmentation component 170 were configured to directly segment the SAR image 143. Thus, the segments 186 in the segmented SAR image 185 are different from segments that would be generated from directly segmenting the SAR image 143. When the artifact reduction component 160 generates the artifact-reduced SAR image product 165 based upon the registered SAR image 146, however, resolution of at least one dimension in the artifact-reduced SAR image product 165 may be less than resolution of the SAR image 143. Accordingly, reducing artifacts in the registered SAR image 146 prior to segmenting is non-intuitive, as it may be expected that segmenting a lower resolution SAR image product may negatively impact classification performed based upon the segmented image product. In addition, the artifact-reduced SAR image product 165 utilized to generate the segments can be based on multiple SAR image products, which can be derived from different SAR backscatter phenomena. The segmentation component 170 facilitates the ability to generate the SAR image segments 176 from a particular SAR backscatter phenomenon and apply those segments to images or image products that exhibit an alternate SAR backscatter phenomenon. For example, an MCCD image product can capture a man-made structure with a high degree of accuracy, and accordingly segments generated based upon the MCCD image product (e.g., MCCD 167) can be applied to a radar cross section image product, which includes characteristic distributions of pixel intensities for different surfaces but may include less well-defined edges for man-made structures.

Returning to the exemplary speckle reduction operations which can be performed by the artifact reduction component 160, the following provides an overview of SA-ML 166, MCCD 167, and MRCS 168 techniques, which can be utilized by the artifact reduction component 160 when generating the artifact-reduced SAR image product 165.

Figure 2:
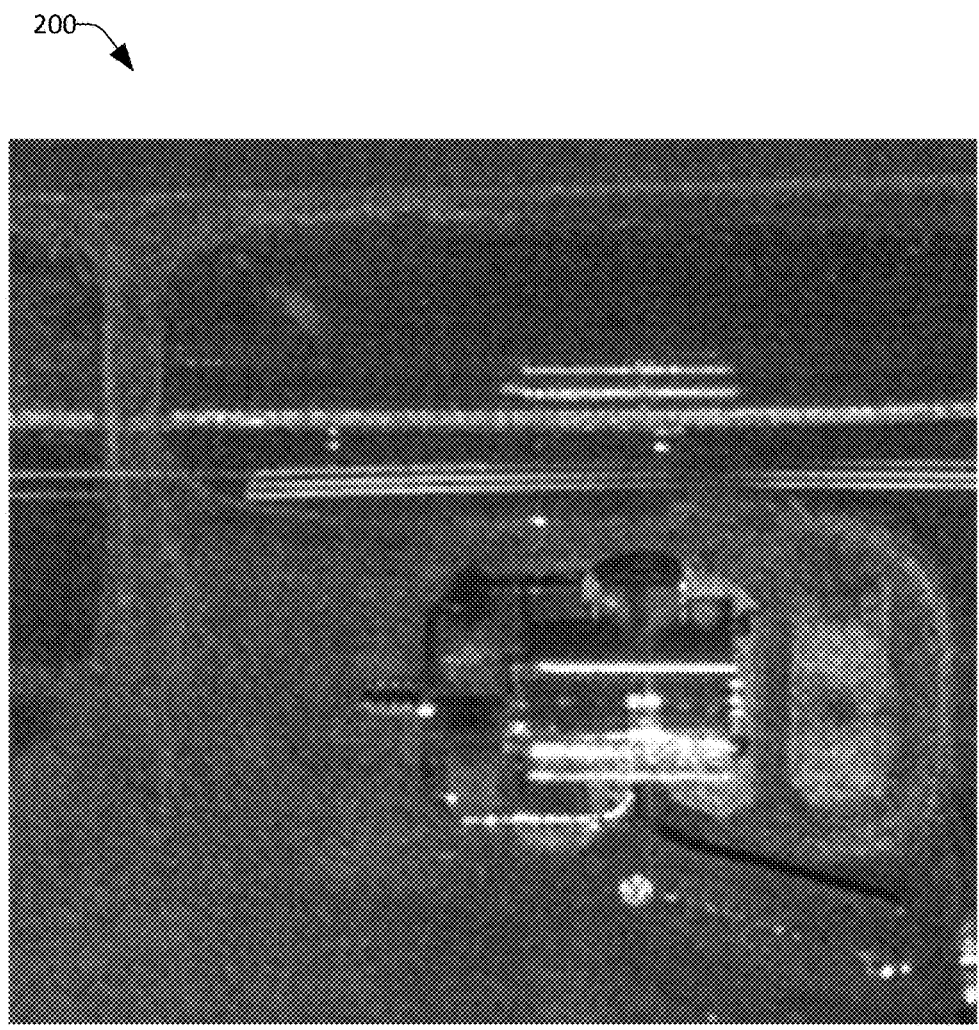
FIG. 2 presents an exemplary subaperture multilook (SA-ML) image product.

Forming a SA-ML image product can require transforming a complex-valued SAR image (e.g., registered SAR image 146) back to the two-dimensional Fourier domain, partitioning the spectrum into non-overlapping pieces, and non-coherently averaging the images formed from each piece of the spectrum. As mentioned above, a SA-ML image product can have a coarser spatial resolution than an SAR backscatter magnitude image formed from the complete phase history, but also has reduced speckle. FIG. 2 presents an example of an SA-ML image product 200 which can be formed by application of the SA-ML imaging algorithm 166 to a SAR image (e.g., registered SAR image 146). The SA-ML image product 200 can be calibrated, and the log-magnitude computed, prior to the segmentation component 170 segmenting the artifact-reduced SAR image product 165 (which is based upon the SA-ML image product 200). For example, the SA-ML image product 200 can be a 20 $\log_{10}$ (SA-ML).

Figure 3:
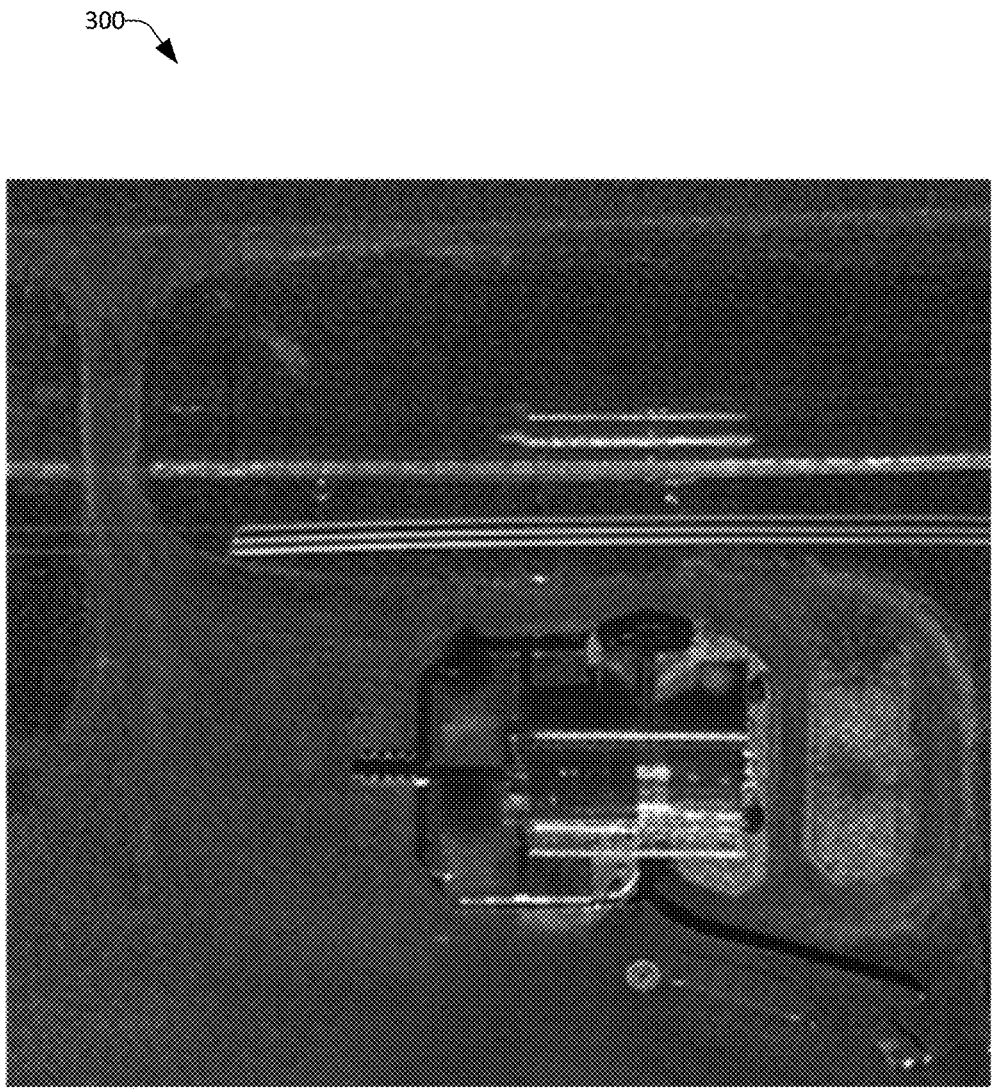
FIG. 3 presents an exemplary median-over-time of radar cross section (MRCS) image product.

A MRCS image product can be formed by utilizing SAR images generated based upon multiple passes over the same scene (e.g., scene 115). Thus, the artifact reduction component 160 receives multiple SAR images (e.g., from the registered images 146-148) that are based upon SAR data generated from different passes over the scene, and utilizes the MRCS algorithm 168 to estimate image statistics for speckle reduction. The MRCS algorithm 168 can form a stack of co-registered Radar Cross Section (RCS) images of the same scene 115 and can compute a pixel-by-pixel median image product to form the MRCS image product, which is a temporal multilook product. The artifact reduction component 160 can compute the log-magnitude of the MRCS image product prior to the segmentation component 170 segmenting the artifact-reduced SAR image product 165, wherein the artifact-reduced SAR image product 165 can be based upon the MRCS image product. In an exemplary embodiment, a MRCS image product can refer to 20 $\log_{10}$ (MRCS). FIG. 3 shows an example of an MRCS image product 300.

A complex-valued radar backscatter (BKS) image can provide not only magnitude of the backscattered radar return, but also a phase of the returned signal (e.g., return signal 124), which can be utilized for determining coherence between multiple passes and for forming interferometric height maps. CCD image products, produced from co-registered images (e.g., registered SAR images 146-148) of the same scene 115 collected at different times (e.g., formed from co-registering SAR images 141-143), can exploit the phase information in the backscatter signal 124 to detect subtle changes such as tire tracks in a dirt road or breeze-induced shifts in vegetation. Collecting a large number of passes (e.g., 25 passes or more) from the same scene 115 enables characterization of patterns of change over time. The artifact reduction component 160 can utilize the MCCD algorithm 168 to generate CCD image products from pairs of images in the registered SAR images 146-148, and further average a plurality of CCD image products together to create a MCCD image product. The MCCD image product represents the average change for different structures/terrains. For example, even a field of windblown grass can produce a smooth MCCD if the change from day to day is consistent.

Figure 4:
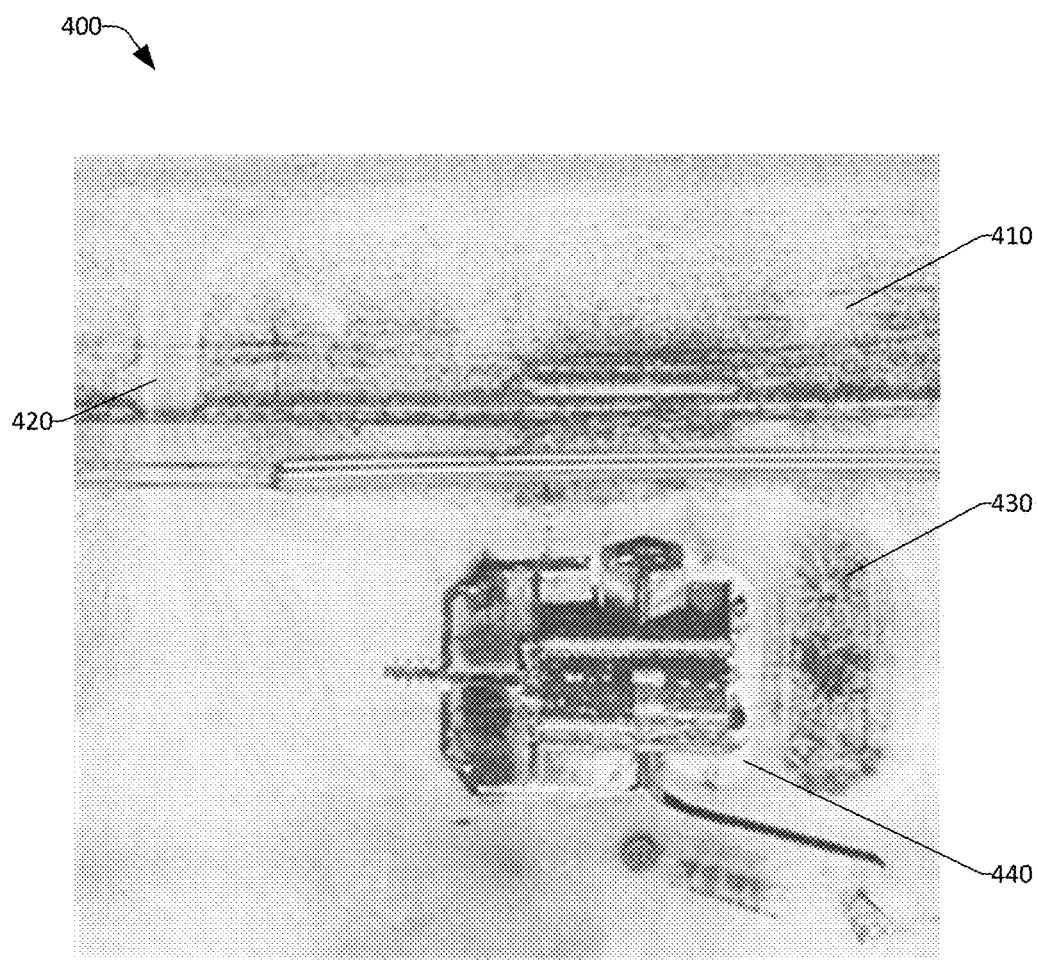
FIG. 4 presents an exemplary mean coherent change detection (CCD) image product.

FIG. 4 shows a MCCD image product formed from an average of 29 CCD image products, where a dark color indicates regions of low average coherence produced by physical scene changes between collection-times of the image pairs, shadows, or regions blocked from the radar signal. The surrounding desert 410 exhibits slightly more change over time than the packed dirt parking lot and driveway 420. The gravel 430 to the right of the building exhibits relatively small change over time whereas the three trees 440 inside the oval planting area have moderate change likely a result of small displacements from wind and weather. A criterion for creating superpixels can be that structures made of the same material have similar change properties over time. The MCCD image product represents structures in the image in slightly different ways than do the products based on backscatter magnitude. Some structures are more prominent and others are less so. Because different surface materials exhibit characteristic mean coherent changes over time, the segmentation component 170 can use MCCD to delineate segments of similar surface type, and the classifier component 190 can exploit MCCD to classify surface types.

In an embodiment, the artifact reduction component 160 can utilize one or more of the speckle reduction techniques SA-ML 166, MRCS 167, MCCD 168 (and optionally other techniques) to form the artifact-reduced SAR image product 165. For example, the artifact-reduced SAR image product 165 can be based upon the three techniques mentioned above, such that each pixel in the artifact-reduced SAR image product 165 has a three-dimensional vector assigned thereto, where the artifact-reduced SAR image product 165 has a resolution of the SA-ML image product. Thus, as noted above, a value of a first dimension for a pixel can be based upon an SA-ML image product (generated by the artifact reduction component 160 through use of the SA-ML 166 technique), a value of a second dimension for the pixel can be based upon an MRCS image product (generated by the artifact reduction component 160 through use of the MRCS 167 technique), and a value of a third dimension for the pixel can be based upon an MCCD image product (generated by the artifact reduction component 160 through use of the MCCD technique 168). The pixel can also have range and azimuth dimensions assigned thereto. Accordingly, the artifact reduction component 160 can generate the artifact-reduced image product 165 such that each pixel has values for an n-dimensional vector assigned thereto, where n is a positive integer.

As previously mentioned, the segmentation component 170 can segment the artifact-reduced SAR image product 165 based upon values of the n-dimensional vector for each pixel in the artifact-reduced SAR image product 165. For example, the segmentation component 170 can employ a distance-based technique when segmenting the artifact-reduced SAR image product 165, such as the QUICK-SHIFT algorithm. Execution of the QUICK-SHIFT algorithm over the artifact-reduced SAR image product 165 causes the artifact-reduced SAR image product 165 to be segmented into superpixels, where each superpixel in the superpixels represents a region of the artifact-reduced SAR image product 165 that comprises pixels having similar intensities in close spatial proximity.

The QUICK-SHIFT algorithm forms a Parzen density estimate of spatial and intensity distance relationships between neighboring pixels in the artifact-reduced SAR image product 165. The distance between pixels i and j, as shown in Eqn. 1, accounts for both difference in intensity and difference in spatial proximity between the two pixels. Per Eqn. 1, $r_i$ is the row index, $c_i$ is the column index and $I_i$ is the intensity of pixel i:

$$d_{ij}^2 = (r_i - r_j)^2 + (c_i - c_j)^2 + (I_i - I_j)^2 \quad (1)$$

Eqn. 2 shows the local Parzen density estimate for a pixel i over a neighborhood $N_W$, where σ is the Gaussian window width and W is the search window width.

$$p_i = \Sigma_{j \in N_W} e^{-d_{ij}^2/2\sigma^2} \quad (2)$$

Figure 5A:
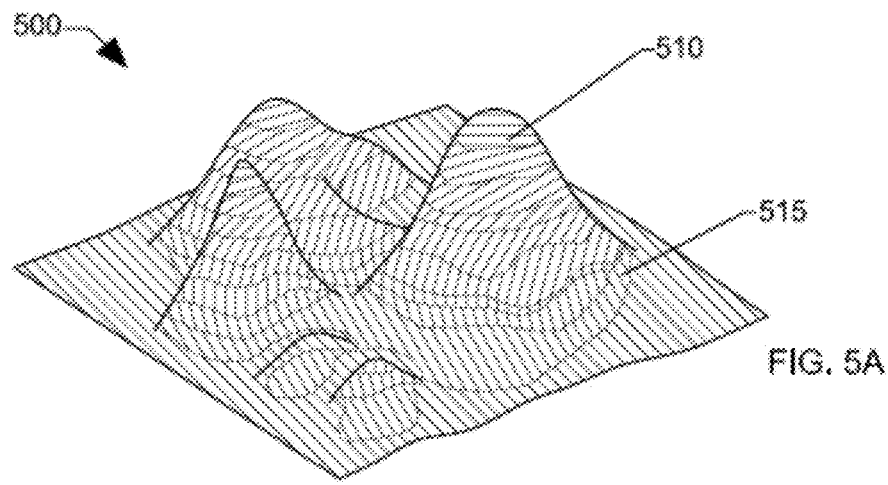
FIG. 5A presents an exemplary diagram of Parzen density estimate of spatial-intensity distance.

The Parzen density estimate produces larger values for pixels whose close neighbors have similar intensities. FIG. 5A presents a conceptual representation of the Parzen density over the row and column grid space comprising a plurality of high intensity regions 510 and lower intensity regions 515.

Figure 5B:
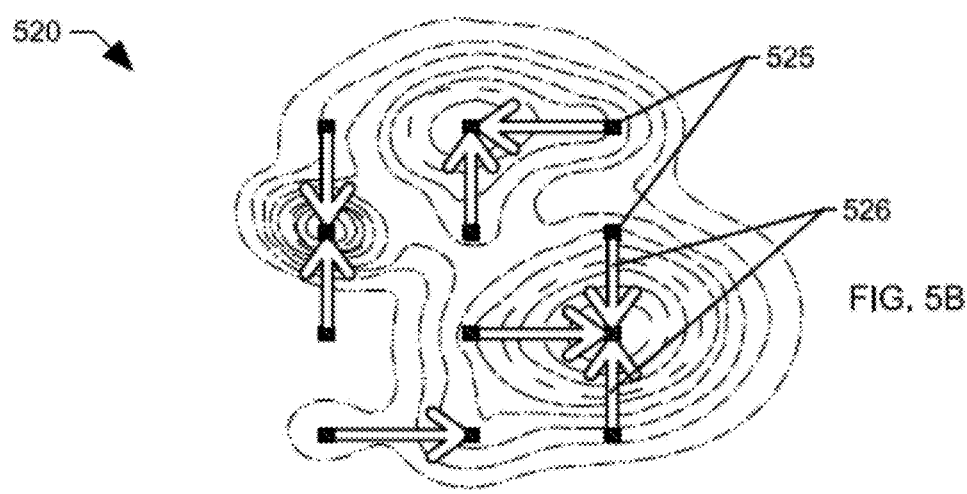
FIG. 5B presents an exemplary diagram of local search for higher-density, minimum-distance parent.
Figure 5C:
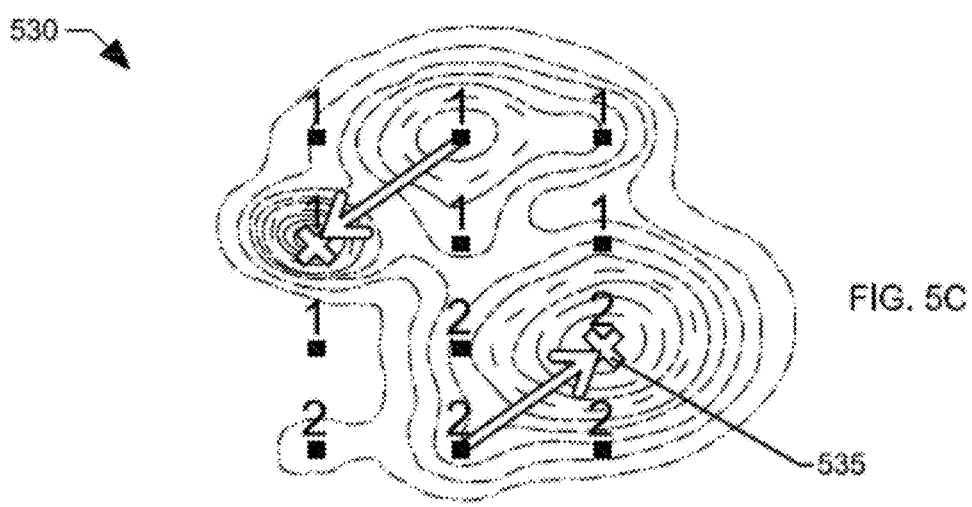
FIG. 5C presents an exemplary diagram of local search for parent-of-parent.

In contrast to gradient search algorithms, which iteratively compute gradients in the direction of a local maximum, a QUICK-SHIFT technique constrains its search to pass through image pixels. For each pixel in the artifact-reduced product 165, QUICK-SHIFT searches a local region to find a "parent" pixel, one that has higher density than itself and closest distance within the search region. FIG. 5B, image 520, illustrates Parzen density contours with dots 525 that indicate the locations of image data pixels. The arrows 526 respectively indicate the association between each pixel, at the tail, and its parent, at the head. Some pixels are self-parents with no tails because they represent local density maxima. Then, each pixel follows parents-of-parents, creating a chain of associations, until it reaches a parent with largest local density. FIG. 5C depicts an example of this second search step, which finds two parent-of-parent pixels indicated by boldface x's, 535. All pixels associated with each local maximum form the corresponding superpixel, where pixels labeled with "1" correspond to one local maximum and pixels labeled with "2" correspond to the other local maximum. By searching for local parent pixels with higher density, QUICK-SHIFT avoids computationally expensive gradient calculations, but still achieves a constrained locally optimal solution. Computational complexity of QUICK-SHIFT is $O(N^2)$.

The SLIC algorithm implements a localized k-means algorithm with a distance metric that depends on both spatial and intensity differences. The Euclidean spatial distance between pixels i and j is provided in Eqn. 3:

$$d_{sij} = \sqrt{(r_i - r_j)^2 + (c_i - c_j)^2} \quad (3)$$

Euclidean intensity distance for 3-channel intensities with weighting factors is provided in Eqn. 4:

$$d_{Iij} = \sqrt{w_1(I_{1i} - I_{1j})^2 + w_2(I_{2i} - I_{2j})^2 + w_3(I_{3i} - I_{3j})^2} \quad (4)$$

In an example, $w_1 = w_2 = w_3 = 1$, although other values are possible, and more or fewer dimensions are contemplated. In an embodiment, per the foregoing, any combination of SA-ML 166 image product, the MRCS 167 image product, and/or the MCCD 168 image product can be selected by the segmentation component 170 as one, two, or three input channels for SLIC segmentation. The input channels can be scaled to similar magnitude ranges with equal weightings. If a particular channel(s) (e.g., any of the SA-ML 166 image product, the MRCS 167 image product, and/or the MCCD 168 image product) is deemed to be more important than another(s), the weightings can be adjusted accordingly. Further, the channel inputs can be weighted to scale a parameter (e.g., amplitude) to a similar range(s). When applying SLIC to either SA-ML or MRCS products, log-magnitude can be first computed. Applying the Euclidean distance in the log-magnitude domain is equivalent to a ratio-intensity distance in the magnitude domain.

As previously mentioned, an n-dimensional vector can also be generated with one of the input channels utilizing IF-H map data. To avoid IF-H map data dominating a superpixel segmentation operation, a weight can be assigned to the IF-H input channel (e.g., a weighting that is eight times smaller than applied to the other product input channels). MLIF indicates a combination of SA-ML and IF-H product inputs, and MLMCIF indicates a combination of SA-ML, MCCD and IF-H product inputs.

Eqn. 5 illustrates how a SLIC-based technique combines spatial and intensity distances together to create its distance measure, which depends on a compactness parameter, m, and an initial superpixel grid spacing parameter, S, where S= $\sqrt{N/k}$, where N is a number of pixels in the artifact-reduced product 165 and k is an initial number of superpixels:

$$D_{ij} = d_{Iij} + \frac{m}{s} d_{sij} \quad (5)$$

Figure 6A:
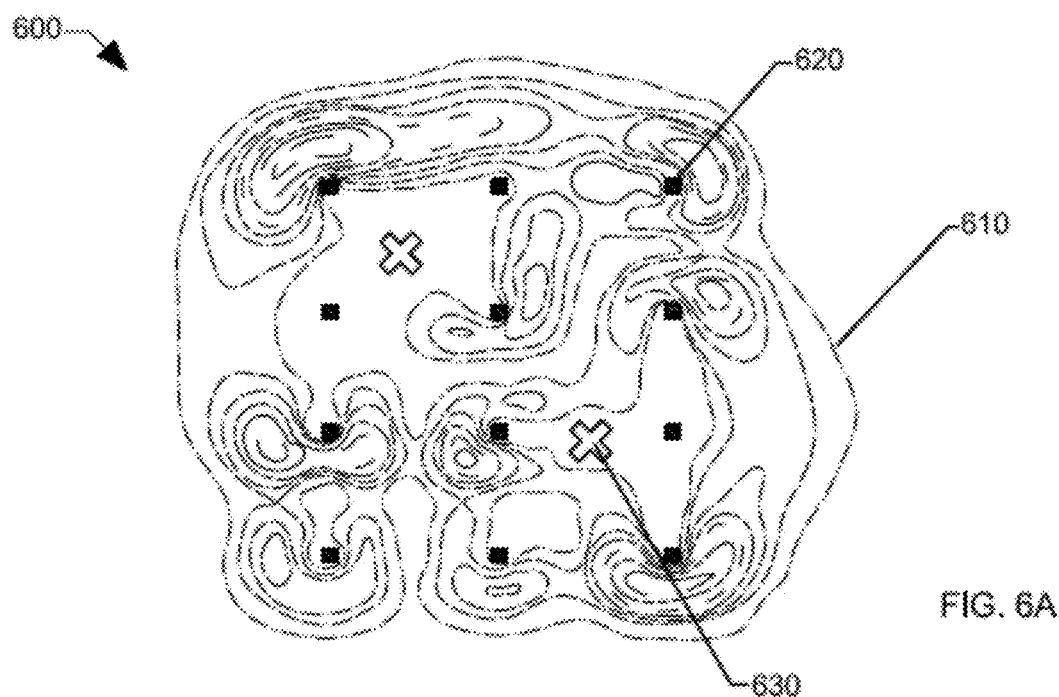
FIG. 6A presents an exemplary diagram of intensity gradient with initial cluster centers located at local minima.
Figure 6B:
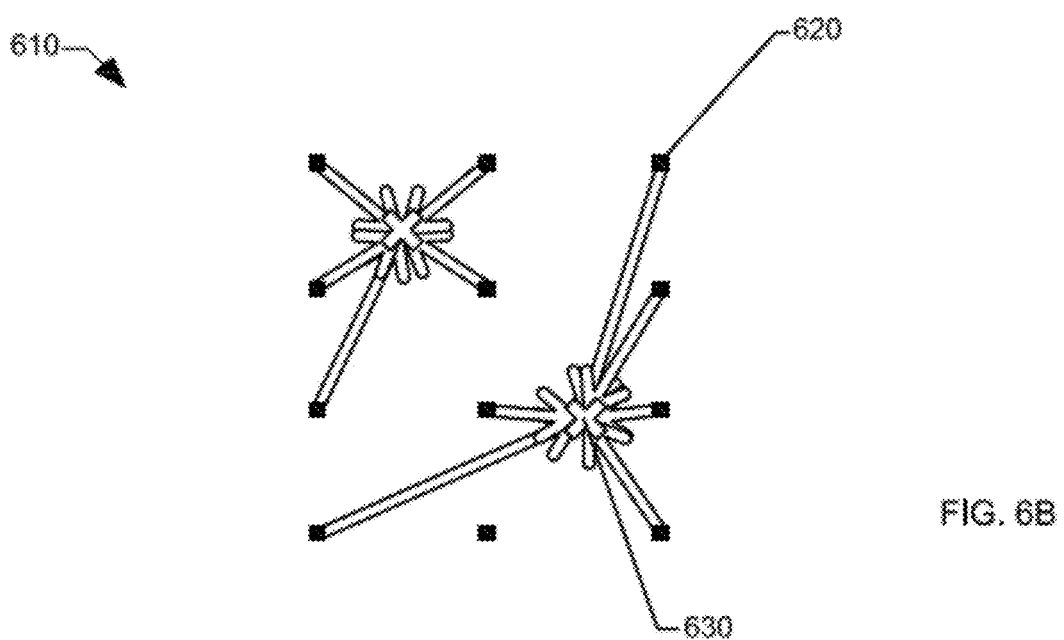
FIG. 6B presents an exemplary diagram of finding a closest local cluster center in local k-means.

Because, the k-means algorithm can produce different cluster results with different cluster center initializations, SLIC-based technique deterministically initializes cluster centers to local minima of the intensity gradient. FIG. 6A, image 600, presents a conceptual representation of intensity gradient contours 610. Dots 620 represent the pixel data locations and boldface x's 630 indicate the initial cluster centers located at two local gradient minima. After initialization, the SLIC-based technique ignores the intensity gradient contours 610. SLIC computes distances between every pixel 620 and every cluster center 630 within a local 2S×2S area. FIG. 6B, image 6B, illustrates that, for each pixel 620, SLIC finds the closest local cluster center 630 and assigns the respective pixel 620 to it. The SLIC algorithm iterates between assigning pixels to closest clusters and updating cluster means. The SLIC algorithm iterates until the change in cluster center means falls below a preset threshold. Initializing cluster centers to the local intensity gradient facilitates speedy convergence, as does confining each search to a local area. Computational complexity of SLIC is $O(N)$.

Any suitable values can be utilized for the QUICK-SHIFT techniques and the SLIC-based techniques, wherein selected values can be a compromise between fidelity in representing various features in the scene 115 and sufficient size to provide accurate statistical estimates for later classification and reasonable computational complexity. For example, values of σ=8 and w=10 can be utilized for QUICK-SHIFT techniques. While, for example, values of S=50K, 25K or 10K can be utilized, along with m=10.

Figure 7A:
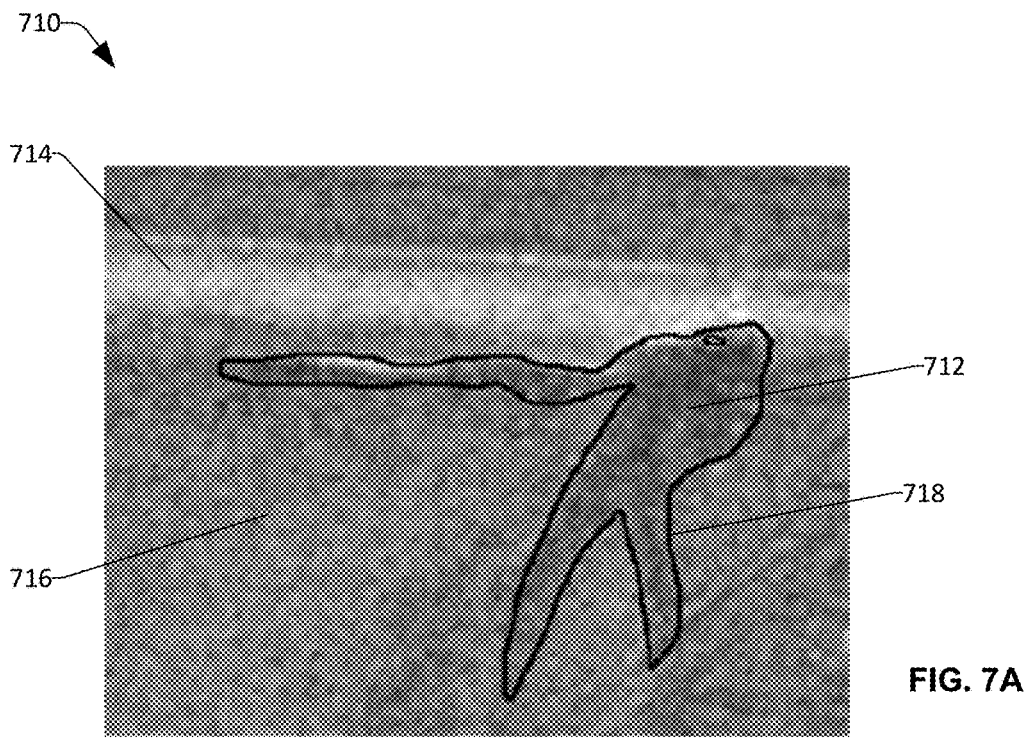
FIG. 7A presents an exemplary MRCS image product including a hand-labeled ground truth.
Figure 7B:
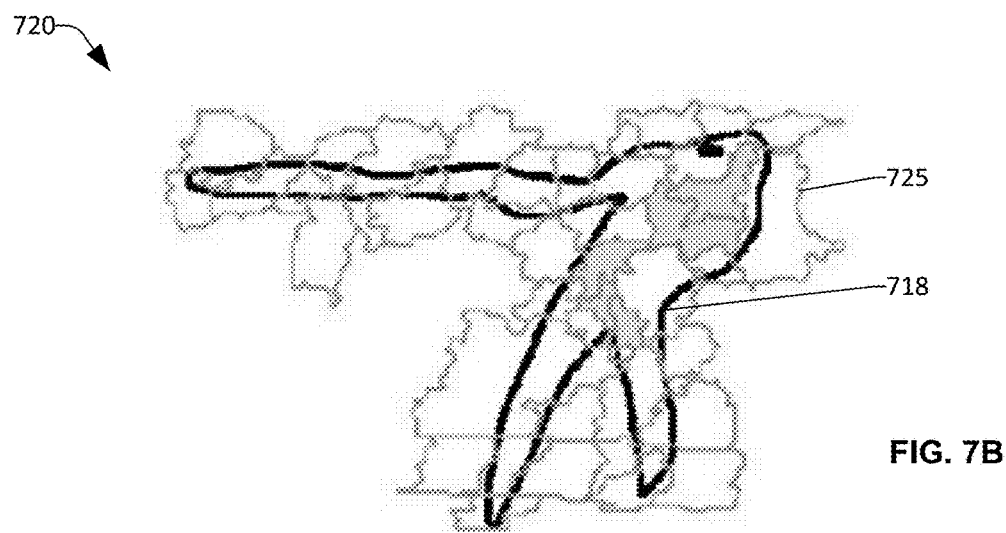
FIG. 7B is a depiction of an exemplary Quick-shift superpixel segmentation process over the MRCS image product shown in FIG. 7A.
Figure 7C:
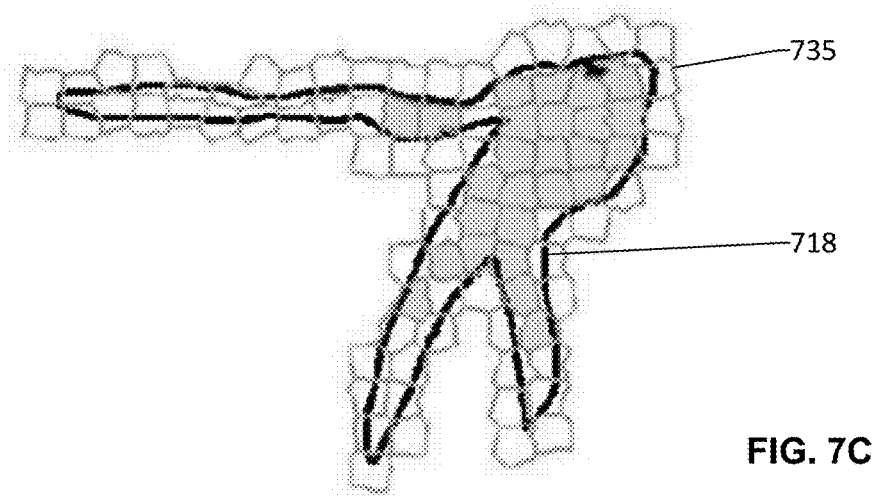
FIG. 7C is a depiction of an exemplary simple linear iterative clustering (SLIC) superpixel segmentation process utilizing a SA-ML image product.

For understanding, FIGS. 7A-7D pertain to analysis of a scene comprising a drainage ditch 712 located between a road 714 and a field 716, wherein, per the MRCS image (FIG. 7A, image 710) the location of the drainage ditch 712 has been outlined by a hand-labelled ground truth 718. FIGS. 7A-7D indicate respective segmentation generated by way of different operations. FIG. 7B, image 720, illustrates superpixels 725 obtained by applying a QUICK-SHIFT-based technique, where σ=8 and w=10. FIG. 7C, image 730, illustrates superpixels 735 obtained by applying a SLIC-based technique, where S=25K and m=10. As shown in FIG. 7C, the SLIC-based technique produces more compact superpixels 735 that conform more readily to the shape of the drainage ditch 712 than the superpixels 725 which are generated via the QUICK-SHIFT-based technique (referenced in FIG. 7B). Further, the superpixels 735 of FIG. 7C are also more uniformly sized, which can be an advantage for making statistical comparisons.

Figure 7D:
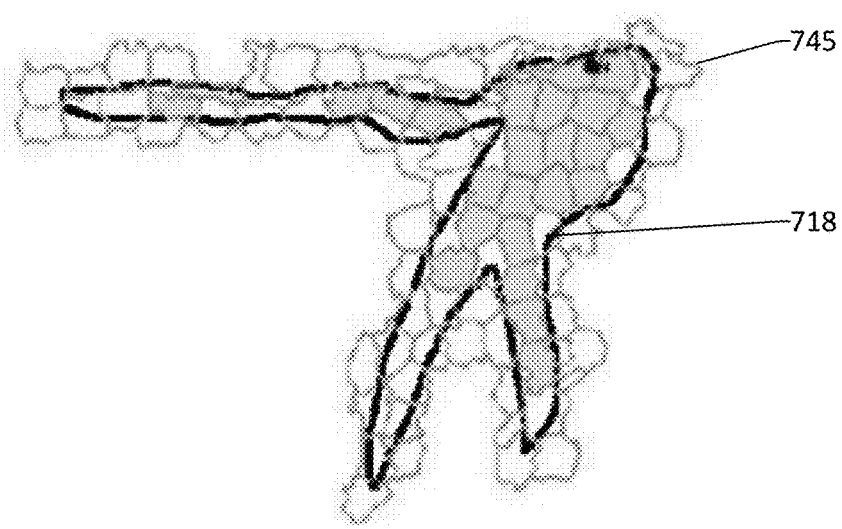
FIG. 7D is an exemplary depiction of a SLIC superpixel segmentation process utilizing a SA-ML image product in conjunction with interferometric height (IF-H) map data.

To correctly map the roadside drainage ditch 712 can be a challenge owing to the drainage ditch 712 having low contrast compared to the background field 716. Accordingly, superpixelation can be improved by including height information into the SPS segmentation. FIG. 7D, image 740, illustrates the resulting superpixels 745 achieved when the artifact-reduced product 165 is based upon both SA-ML and IF-H products, where S=25K and m=10. As shown in FIG. 7D, adding the interferometric height information improves the ability of the superpixels to represent two of the three arms of the drainage ditch 712 when compared with the superpixels 725 and 735 in respective images 7B and 7C.

The artifact reduction component 160 and the segmentation component 170 can operate in unison to select and utilize one or more of the imaging processes SA-ML imaging 166, MCCD imaging 167, or MRCS imaging 16 (or other suitable data). For example, a product of SA-ML imaging 166 can contain lower spatial frequencies which yield superpixels having smoother edges, which can be advantageous when attempting to represent edges of a man-made structure(s) that may be included in the scene 115. Further, it is possible to utilize SA-ML-derived superpixels to process data from any of the other image products, as long as they are co-registered. For example, if multiple images are not available from the same scene 115 to compute a temporal multilook MRCS image 168 products, it is possible to create superpixels from an SA-ML image 166 and then apply them to a co-registered MRCS image. In another example, it is possible to compute superpixel histograms from higher resolution MRCS pixels located inside SA-ML superpixels. Such histograms can be useful for classifying surfaces in a SAR image (e.g., any of SAR images 141-143, registered SAR images 146-148, etc.).

Figure 8A:
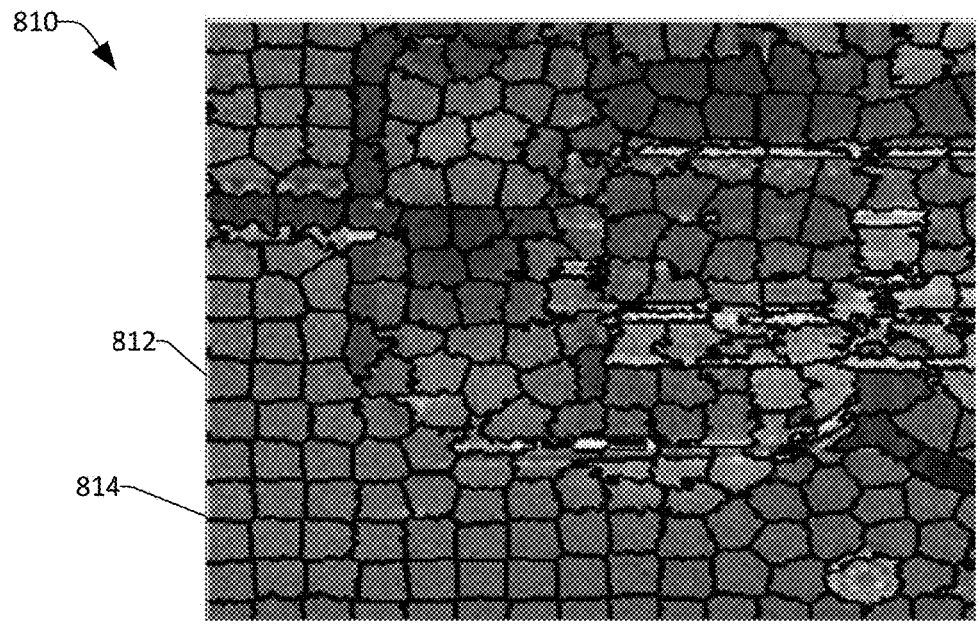
FIG. 8A presents an exemplary image segmentation formed by SLIC based upon an MRCS image product.

FIGS. 8A-8D present respective images for comparison of superpixels derived from different SAR imaging inputs. FIG. 8A presents a SPS image 810 formed with the segmentation component 170 utilizing SLIC processing in conjunction with MRCS imaging 168, wherein the SPS image 810 comprises segments 812 having respective boundaries 814, wherein the segments 812 are formed in conjunction with superpixels in a superpixel image 175.

Figure 8B:
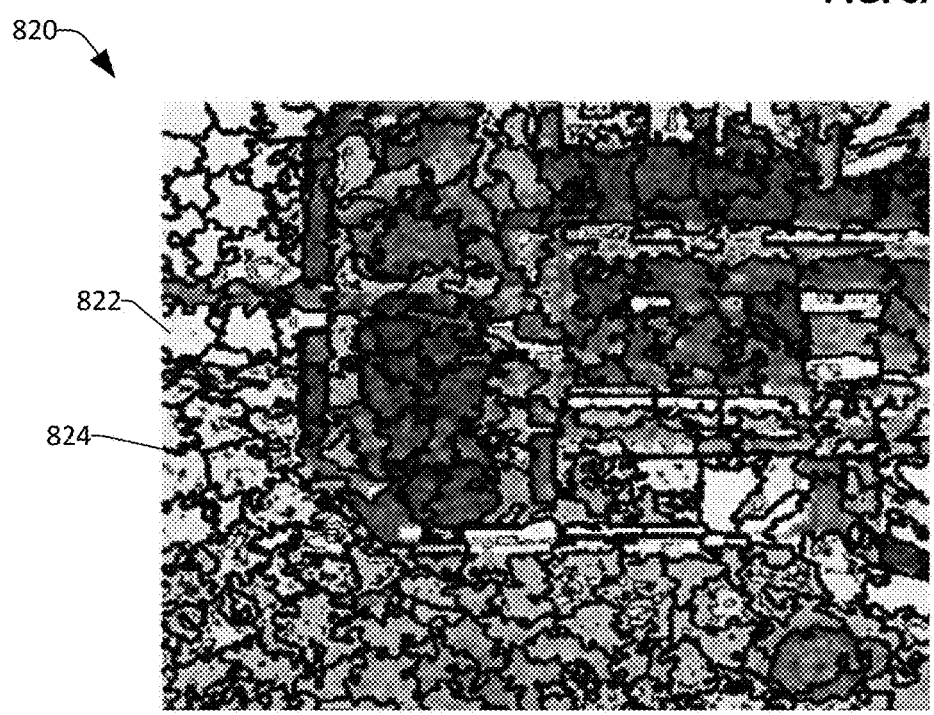
FIG. 8B presents an exemplary image segmentation formed by SLIC based upon an MCCD image product.

FIG. 8B presents a SPS image 820 formed with the segmentation component 170 utilizing SLIC processing in conjunction with MCCD imaging 167. Because a MCCD image product represents a different physical phenomenon than RCS-based image products, superpixel segmentation utilizing a MCCD image product can emphasize different structural features. The SPS image product 820 comprises segments 822 having respective boundaries 824. Boundaries 824 of MCCD-based superpixels 822 can be contorted to conform to the local variability of the MCCD image product.

Figure 8C:
FIG. 8C presents an exemplary image segmentation formed by SLIC based upon SA-ML and MCCD image products.

FIG. 8C presents an SPS image 830 formed with the segmentation component 170 utilizing SLIC processing in conjunction with SA-ML imaging 166 combined with MCCD imaging 167 at two channels of the SLIC algorithm. The SPS image 830 comprises segments 832 having respective boundaries 834. The SA-ML image product and the MCCD image product are scaled to similar ranges and equally weighted.

Figure 8D:
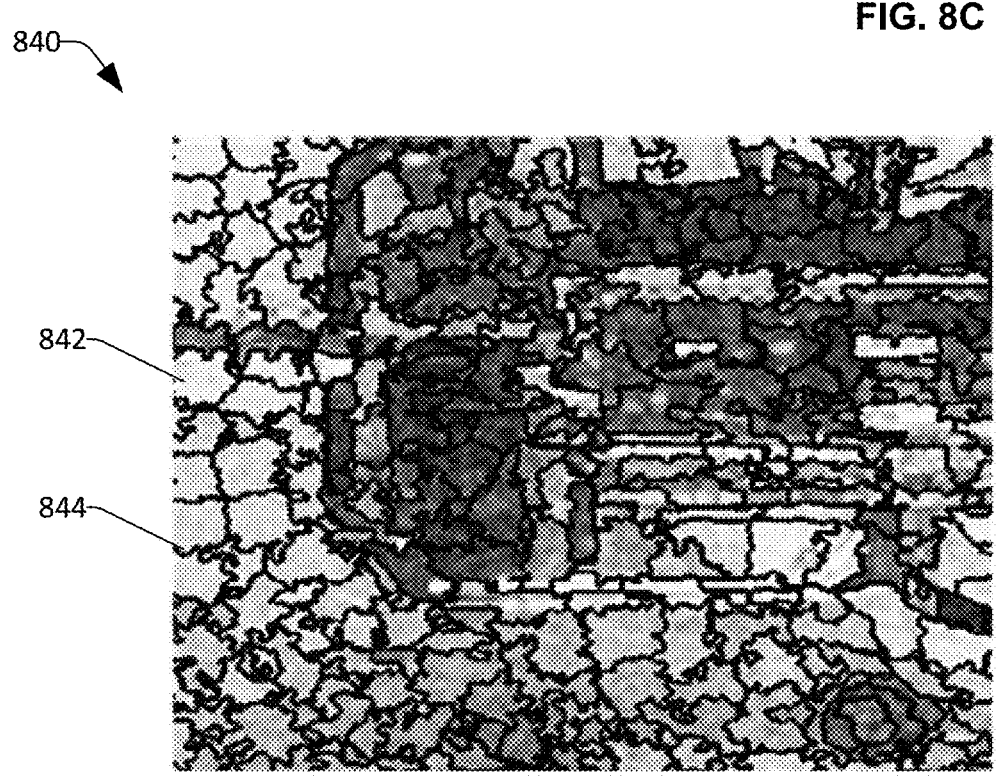
FIG. 8D presents an exemplary image segmentation formed by SLIC based upon a combination of SA-ML, MCCD and IF-H image products.

FIG. 8D presents an SPS image 840 formed with the segmentation component 170 utilizing SLIC processing in conjunction with SA-ML imaging 166 combined with MCCD imaging 167 and further IF-H imaging 169 at three channels at the input of SLIC algorithm, wherein the IF-H imaging 169 enables height discrimination (e.g., for the previously mentioned drainage ditch). SPS image 840 comprises segments 842 having respective boundaries 844.

Figure 9:
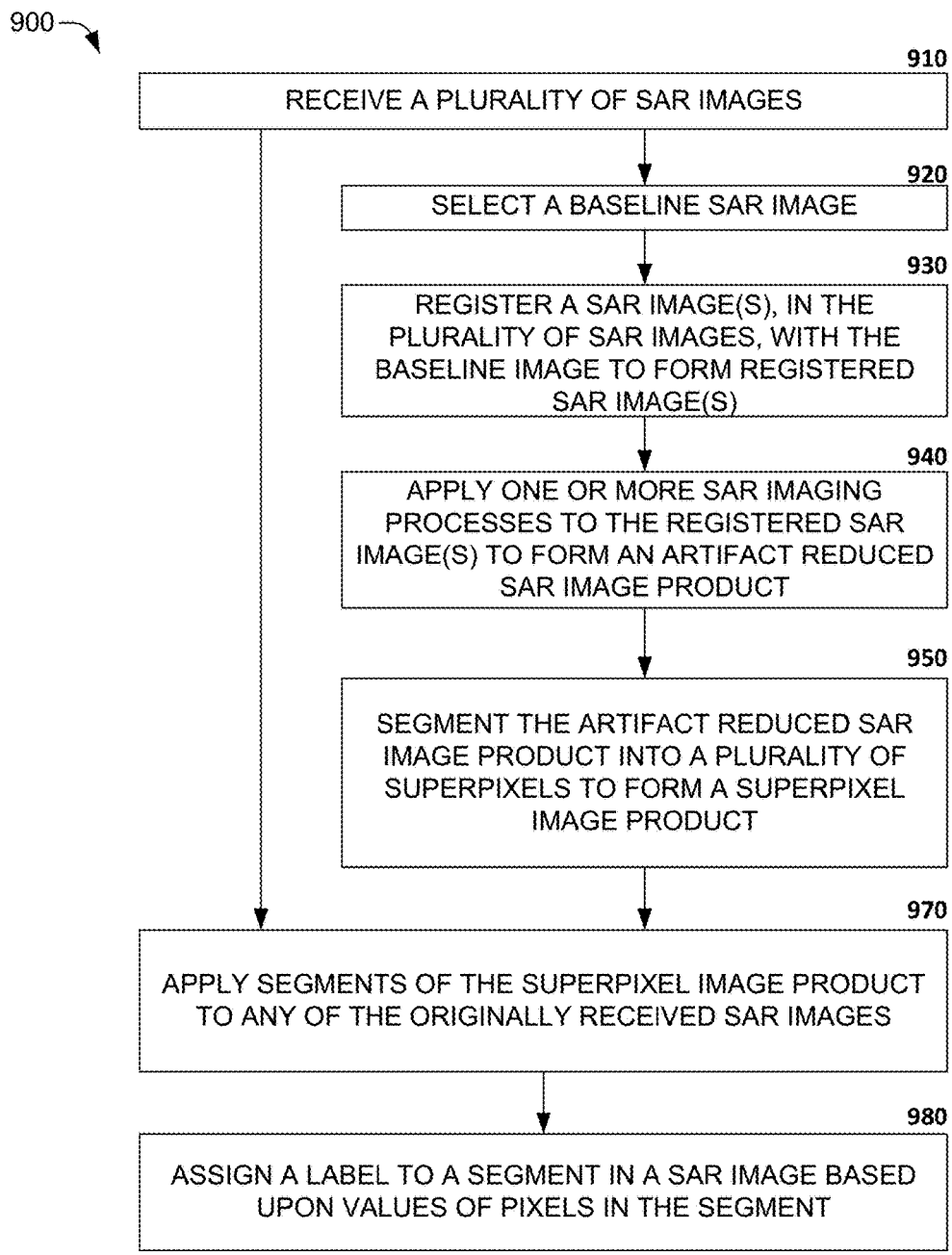
FIG. 9 is a flow diagram illustrating an exemplary methodology for assigning labels to segments in a SAR image, where the SAR image is segmented based upon a speckle-reduced SAR image product.

FIG. 9 illustrates an exemplary methodology 900 relating to segmenting a SAR image. While the methodology is shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

At 910, a plurality of SAR images can be received, wherein the plurality of SAR images have been generated based upon a plurality of aircraft flybys over a common scene.

At 920, a baseline SAR image is selected from the plurality of received SAR images.

At 930, respective images in the plurality of received SAR images can be registered with the baseline image to form one or more registered SAR images.

At 940, one or more SAR imaging processes are applied to the one or more registered SAR images to product an artifact-reduced SAR image product. As previously described, an originally received SAR image can include speckle, wherein the speckle can impact segmentation of the original SAR image. Accordingly, any of a SA-ML technique, a MCCD technique, a MRCS technique, or other suitable technique can be applied to the registered SAR image (or images) to generate an artifact-reduced SAR image product. The plurality of registered SAR images can be arranged to form a registered SAR image stack.

At 950, a SPS process can be performed on the artifact-reduced SAR image product to generate a segmented image product. The segmentation process can utilize any suitable SPS process such as SLIC, QUICK-SHIFT, etc.

At 970, segments of the segmented superpixel image product can be applied to any of the originally received SAR images to segment the originally received SAR images into a plurality of segments.

At 980, a segment in the originally received SAR image can be assigned a label based upon pixel values in the segment. For instance, a classifier can be trained to identify a particular object, feature, or the like, and can label a segment as including (or not including) the feature based upon pixel values in the segment.

Figure 10:
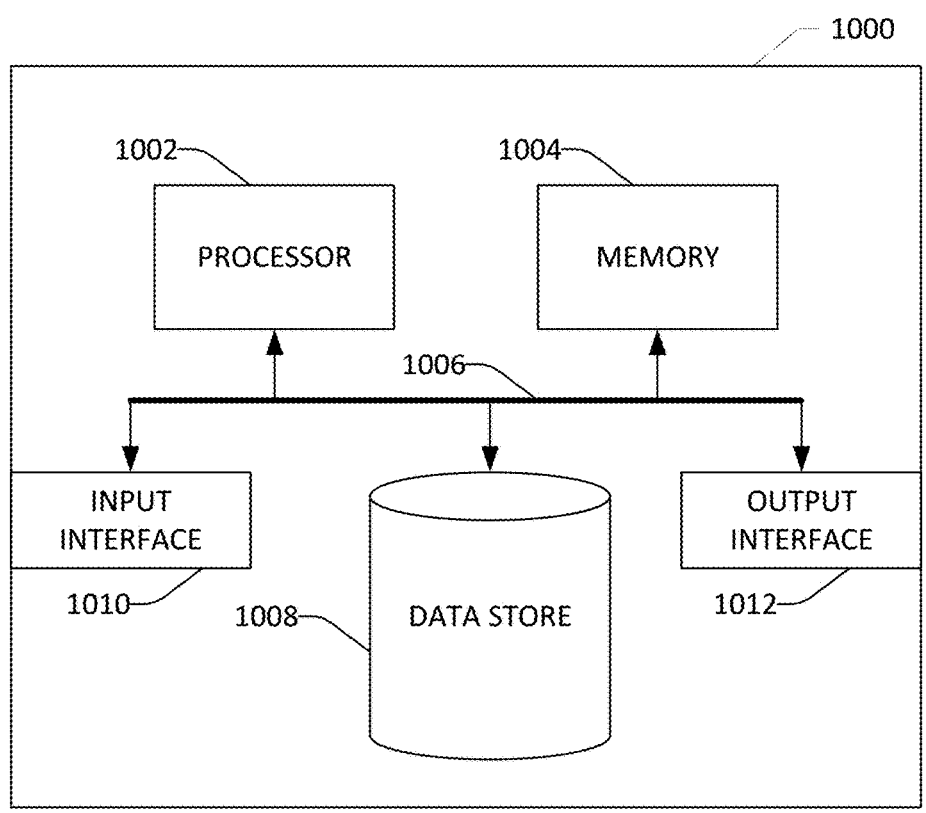
FIG. 10 illustrates an exemplary computing device.

Referring now to FIG. 10, a high-level illustration of an exemplary computing device 1000 that can be used in accordance with the systems and methodology disclosed herein is illustrated. For example, the computing device 1000 may be utilized to generate any of an artifact-reduced product 165, a segmented image product 175, a segmented SAR image 185, etc. For example, computing device 1000 can operate as the classification device 151, or a controller (associated with) the radar system 120. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store image products, SAR data, etc.

The computing device 1000 additionally includes a data store 1008 that is accessible by the processor 1002 by way of the system bus 1006. The data store 1008 may include executable instructions, image products, SAR data, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc., by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system comprising:
   an antenna that is configured to receive radar signals that have reflected off of a scene;
   a processor; and
   memory that comprises components that are executed by the processor, the components comprising:
   a registration component that is configured to register a baseline synthetic aperture radar (SAR) image with a plurality of SAR images to create a stack of co-registered SAR images, wherein the plurality of SAR images are generated based upon the radar signals received by the antenna;
   an artifact reduction component that is configured to perform a speckle-reduction operation on at least one SAR image in the stack of co-registered SAR images to form an artifact-reduced SAR image product, a first number of artifacts in the artifact-reduced SAR image product is less than a second number of artifacts in the at least one SAR image;
   a segmentation component that is configured to:
   form a segmented SAR image product by segmenting the artifact-reduced SAR image product into a plurality of superpixels based upon values of pixels in the artifact-reduced SAR image product; and
   apply boundaries of the superpixels to the at least one SAR image to segment the at least one SAR image into a plurality of segments, such that the plurality of segments respectively correspond to the plurality of superpixels in the segmented SAR image product; and
   a classifier component that is configured to assign a label to a segment in the plurality of segments in the at least one SAR image based upon pixel values in the segment, the label indicative of an identity of an object or feature captured in the at least one SAR image.

2. The system of claim 1, the artifacts being speckle.

3. The system of claim 2, the artifact reduction component is configured to utilize at least one of a sub-aperture multilook (SA-ML) imaging process, a mean-over-time of coherent change detection (MCCD) imaging process, or a median-over-time of radar cross section (MRCS) imaging process to form the artifact-reduced SAR image product.

4. The system of claim 3, the artifact reduction component further configured to form the artifact-reduced SAR image product such that each pixel in the artifact-reduced SAR image product is assigned values for an n-dimensional vector, the n-dimensional vector is formed based upon the SA-ML imaging process, the MCCD imaging process, or the MRCS imaging process.

5. The system of claim 1, the segmentation component is configured to utilize one of QUICK-SHIFT or simple linear iterative clustering (SLIC) to segment the artifact-reduced SAR image product into the plurality of superpixels.

6. The system of claim 5, the artifact-reduced SAR image product is further based upon application of an interferometric height (IF-H) mapping process to the at least one SAR image.

7. The system of claim 1, further comprising a radar system that comprises the antenna, the radar system is configured to generate SAR data as the radar system passes over the scene, the at least one SAR image is based upon the SAR data.

8. The system of claim 1, the classifier component assigns the label to the segment based upon comparing the pixel values in the segment with pre-classified data.

9. The system of claim 1, the registration component is further configured to resample a first SAR image in the plurality of SAR images to cause the first SAR image to comprise a same number of pixels as a second SAR image in the plurality of SAR images.

10. A method, comprising:
  receiving, at an antenna of a radar system, radar signals that have reflected off of a scene, wherein a plurality of synthetic aperture radar (SAR) images are generated based upon the radar signals received at the antenna;
  registering the plurality of SAR images to form a stack of registered SAR images;
  generating an artifact-reduced SAR image product based upon at least one registered SAR image from the stack of registered SAR images, the artifact-reduced SAR image product comprises fewer artifacts than the at least one registered SAR image;
  segmenting the artifact-reduced SAR image product into a plurality of superpixels to form a superpixel image product;
  applying boundaries of the superpixels to the at least one registered SAR image to form a segmented SAR image, the segmented SAR image comprises a plurality of segments that correspond to the superpixels of the superpixel image product; and
  assigning a label to a segment in segmented SAR image based upon values of pixels in the segment, the label indicative of an identity of an object or feature captured in at least one image in the plurality of SAR images.

11. The method of claim 10, the artifacts being speckle.

12. The method of claim 10, wherein generating the artifact-reduced image product comprises performing at least one of a sub-aperture multilook (SA-ML) imaging process, a mean-over-time of coherent change detection (MCCD) imaging process, or a median-over-time of radar cross section (MRCS) imaging process to the at least one registered SAR image.

13. The method of claim 12, each pixel in the artifact-reduced SAR image product has a n-dimensional vector assigned thereto, values of the n-dimensional vector are based upon at least one of the SA-ML imaging process, the MCCD imaging process, or the MRCS imaging process.

14. The method of claim 10, wherein segmenting the artifact-reduced SAR image product into the plurality of superpixels comprises utilizing at least one of QUICK-SHIFT or simple linear iterative clustering (SLIC) to segment the artifact-reduced SAR image product into the plurality of superpixels.

15. The method of claim 10, wherein generating the artifact-reduced SAR image product comprises:
  acquiring interferometric height (IF-H) data for the at least one registered SAR image; and
  generating the artifact-reduced SAR image product based upon the IF-H data.

16. The method of claim 10, wherein registering the plurality of SAR images comprises resampling a first SAR image in the plurality of SAR images to cause the first SAR image to comprise a same number of pixels as a second SAR image in the plurality of SAR images.

17. A non-transitory computer-readable storage medium comprising instructions that, when executed by a processor, cause the processor to perform acts comprising:
  generating a plurality of synthetic aperture radar (SAR) images based upon radar signals received by an antenna of a radar system, wherein the radar signals have been directed towards a scene and have reflected off of the scene prior to being received by the antenna;
  registering the plurality of SAR images to form a stack of registered SAR images;
  applying a speckle reduction algorithm to at least one registered SAR image in the stack of registered SAR images to form an artifact-reduced SAR image product, the artifact-reduced SAR image product comprises fewer artifacts than the at least one registered SAR image;
  segmenting the artifact-reduced SAR image product into a plurality of superpixels to form a superpixel image product;
  applying boundaries of the superpixels in the superpixel image product to the at least one registered SAR image to form a segmented SAR image that comprises a plurality of segments, the plurality of segments respectively correspond to the plurality of superpixels; and
  assigning a label to a segment in the plurality of segments based upon values of pixels in the segment, the label indicative of an identity of an object or feature captured in at least one SAR image in the plurality of SAR images.

18. The computer-readable storage medium of claim 17, the speckle reduction algorithm is one of a sub-aperture multilook (SA-ML) imaging algorithm, a mean-over-time of coherent change detection (MCCD) imaging algorithm, or a median-over-time of radar cross section (MRCS) imaging algorithm.

19. The computer-readable storage medium of claim 17, the artifacts being speckle.

20. The computer-readable storage medium of claim 17, wherein registering the plurality of SAR images comprises resampling a first SAR image in the plurality of SAR images to cause the first SAR image to comprise a same number of pixels as a second SAR image in the plurality of SAR images.

* * * * *